(12) United States Patent
Johnson

(10) Patent No.: US 6,439,220 B1
(45) Date of Patent: Aug. 27, 2002

(54) BARBECUE GRILL AND CART ASSEMBLY

(75) Inventor: Mark Johnson, Wilmette, IL (US)

(73) Assignee: Weber-Stephen Products Co., Palatine, IL (US)

(*) Notice: Subject to any disclaimer, the term of this patent is extended or adjusted under 35 U.S.C. 154(b) by 0 days.

(21) Appl. No.: 09/637,655

(22) Filed: Aug. 11, 2000

(51) Int. Cl.⁷ .............................. A47J 37/00; F24B 3/00
(52) U.S. Cl. .................. 126/25 R; 126/41 R; 126/276; 248/188; 248/440.1
(58) Field of Search ................ 126/25 R, 9 R, 126/276, 304 R, 305, 41 R; 431/343; 248/188, 188.8, 163.1, 165, 440, 440.1, 230.3, 230.5, 231.61, 231.41; 292/305; 403/389, 390, 391

(56) References Cited

U.S. PATENT DOCUMENTS

| | | |
|---|---|---|
| 1,460,928 A | 7/1923 | Tilden |
| 1,964,805 A | 7/1934 | Barnes ................... 126/268 |
| 2,055,564 A | 9/1936 | Tinnerman ............... 126/304 |
| 2,122,275 A | 6/1938 | Bitney ..................... 126/30 |
| 2,154,165 A | 4/1939 | Huntington ............... 126/29 |
| 2,172,611 A * | 9/1939 | Gerhardt et al. ......... 248/440.1 |
| 2,207,307 A | 7/1940 | Teller et al. ............. 126/39 |
| 2,447,925 A | 8/1948 | Vorbusch ................ 126/40 |
| 2,484,239 A | 10/1949 | Moon et al. .............. 126/25 |
| 2,530,166 A | 11/1950 | Johannsen ................ 126/25 |
| 2,541,528 A | 2/1951 | McAvoy ................... 126/25 |
| 2,600,234 A | 6/1952 | Foley ..................... 99/421 |
| 2,723,658 A | 11/1955 | Schmieding ............... 126/25 |
| 2,740,395 A | 4/1956 | Goodwin .................. 126/25 |
| 2,768,042 A | 10/1956 | Persinger et al. ......... 311/17 |
| 2,787,995 A | 4/1957 | Alter ..................... 126/25 |
| 2,821,762 A * | 2/1958 | Foose ..................... 248/440.1 |
| 2,842,044 A | 7/1958 | Kirk ...................... 99/339 |
| 2,886,386 A | 5/1959 | Spitzer ................... 311/17 |
| 2,932,479 A | 4/1960 | Leach ..................... 248/129 |
| 2,940,381 A | 6/1960 | Cottonghim et al. ........ 99/445 |
| 3,111,337 A * | 11/1963 | Kates ..................... 248/188 |
| 3,209,743 A | 10/1965 | Stewart et al. ............ 126/25 |
| 3,330,266 A | 7/1967 | Stephen .................. 126/25 |
| D214,220 S | 5/1969 | ver Halen ................ D81/10 |
| 3,452,736 A | 7/1969 | Harff et al. .............. 126/25 |
| 3,538,906 A | 11/1970 | Heraty et al. ............. 126/25 |
| D219,629 S | 12/1970 | Koziol ................... D81/10 |
| 3,556,076 A | 1/1971 | Stewart ................... 126/9 |
| 3,586,518 A | 6/1971 | Folmar .................... 99/259 |
| 3,611,915 A | 10/1971 | Glaser .................... 99/445 |
| 3,714,937 A | 2/1973 | Linstead .................. 126/25 R |
| 3,754,728 A * | 8/1973 | Bowman ................... 248/188 |
| 3,959,620 A | 5/1976 | Stephen, Jr. .............. 219/386 |
| 4,108,142 A | 8/1978 | Barson et al. ............. 126/41 R |
| 4,281,633 A | 8/1981 | Wackerman ................ 126/25 C |
| 4,331,123 A | 5/1982 | Alles et al. .............. 126/9 R |
| 4,337,751 A | 7/1982 | Sampson et al. ........... 126/25 R |
| 4,362,093 A | 12/1982 | Griscom .................. 99/339 |
| 4,382,432 A | 5/1983 | Lindes .................... 126/25 |
| 4,416,248 A | 11/1983 | Schlosser ................. 126/9 R |
| 4,453,530 A | 6/1984 | Schlosser ................. 126/25 R |
| 4,498,452 A | 2/1985 | Schlosser et al. .......... 126/9 R |
| D278,021 S | 3/1985 | Schlosser et al. .......... D7/332 |
| 4,535,749 A | 8/1985 | Schlosser et al. .......... 126/25 R |
| 4,583,452 A | 4/1986 | Grosse ................... 99/427 |

(List continued on next page.)

Primary Examiner—Henry Bennett
Assistant Examiner—Josiah C. Cocks
(74) Attorney, Agent, or Firm—Wallenstein & Wagner, Ltd.

(57) ABSTRACT

The present invention is a frame assembly for a barbecue grill that provides rigid support for a cooking chamber and a work surface disposed adjacent to the chamber. The frame assembly comprises at least two U-shaped frame members, each formed of a bended contiguous tubular material, with at least one support member disposed transverse to the U-shaped members attached thereto, such that the two U-shaped frame members are in a spaced relation to each other to create a space therebetween to accommodate a cooking chamber and a work surface.

23 Claims, 3 Drawing Sheets

U.S. PATENT DOCUMENTS

| | | | |
|---|---|---|---|
| D284,929 S | 8/1986 | Schlosser et al. | D7/332 |
| 4,635,613 A | 1/1987 | Tucker et al. | 126/25 R |
| 4,663,517 A | 5/1987 | Huff et al. | 219/404 |
| 4,665,888 A | 5/1987 | Christen, Jr. et al. | 126/25 R |
| 4,665,891 A | 5/1987 | Nemec et al. | 126/25 R |
| 4,677,964 A | 7/1987 | Lohmeyer et al. | 126/41 R |
| 4,688,541 A | 8/1987 | Stephen et al. | 126/25 R |
| D293,067 S | 12/1987 | Stephen et al. | D7/334 |
| D295,135 S | 4/1988 | Ogden | D7/334 |
| D298,406 S | 11/1988 | Stephen et al. | |
| 4,823,684 A | 4/1989 | Traeger et al. | 99/447 |
| 4,886,045 A | 12/1989 | Ducate, Jr. et al. | 126/41 R |
| 4,895,068 A | 1/1990 | Hanagan et al. | 99/357 |
| 4,896,652 A | 1/1990 | Geiter | 126/41 R |
| 4,924,846 A | 5/1990 | Peacock et al. | 126/41 R |
| 4,955,358 A * | 9/1990 | Harris et al. | 126/25 R |
| D315,079 S | 3/1991 | Jui-Yem | D7/334 |
| D316,355 S | 4/1991 | Stephen et al. | D7/339 |
| 5,016,607 A | 5/1991 | Doolittle et al. | 126/25 R |
| 5,027,788 A | 7/1991 | Schlosser et al. | 126/25 R |
| 5,050,577 A | 9/1991 | Baynes et al. | 126/9 R |
| 5,056,364 A | 10/1991 | Kahler et al. | 73/296 |
| 5,070,776 A | 12/1991 | Schlosser et al. | 99/450 |
| 5,072,718 A | 12/1991 | Seal | 126/41 R |
| 5,076,252 A | 12/1991 | Schlosser et al. | 126/25 R |
| 5,076,256 A | 12/1991 | Raymer et al. | 126/41 R |
| 5,076,257 A | 12/1991 | Raymer et al. | 126/41 R |
| 5,090,398 A | 2/1992 | Raymer et al. | 126/41 R |
| 5,109,834 A | 5/1992 | Collins et al. | 126/41 R |
| 5,111,802 A | 5/1992 | Lin | 126/25 R |
| D327,390 S | 6/1992 | Schlosser et al. | D7/334 |
| 5,163,358 A | 11/1992 | Hanagan et al. | 99/339 |
| 5,203,317 A | 4/1993 | James | 126/41 R |
| 5,253,634 A | 10/1993 | LeBeouf | 126/25 |
| 5,277,106 A | 1/1994 | Raymer et al. | 99/447 |
| 5,299,553 A | 4/1994 | Giebel et al. | 126/25 R |
| 5,327,879 A | 7/1994 | Ferraro | 126/41 R |
| 5,341,793 A | 8/1994 | Brown | 126/41 R |
| 5,408,985 A | 4/1995 | Giebel et al. | 126/41 R |
| 5,483,947 A | 1/1996 | Giebel et al. | 126/41 R |
| 5,572,983 A | 11/1996 | Schlosser et al. | 126/25 R |
| 5,579,755 A | 12/1996 | Johnston | 126/41 R |
| 5,598,834 A | 2/1997 | Grady | 126/506 |
| 5,617,779 A | 4/1997 | Dutczak | 99/450 |
| 5,623,866 A * | 4/1997 | Home | 126/25 R |
| D380,933 S | 7/1997 | Schlosser et al. | D7/334 |
| D395,378 S | 6/1998 | Schlosser et al. | D7/403 |
| 5,765,469 A | 6/1998 | Schlosser et al. | 99/337 |
| 5,836,298 A | 11/1998 | Grady | 126/506 |
| D404,963 S | 2/1999 | Schlosser et al. | D7/334 |
| 5,873,355 A | 2/1999 | Schlosser et al. | 12/41 R |
| 5,934,183 A | 8/1999 | Schlosser et al. | 99/385 |
| 5,934,184 A | 8/1999 | Schlosser et al. | 99/385 |
| 5,941,229 A | 8/1999 | Schlosser et al. | 126/41 |
| 6,000,389 A | 12/1999 | Alpert | 126/25 R |

\* cited by examiner

BARBECUE GRILL AND CART ASSEMBLY

TECHNICAL FIELD

The present invention relates generally to outdoor cooking devices, such as a barbeque grill, and more particularly to a barbeque charcoal grill having a frame assembly that provides support structure for a cooking chamber, and one or more work surfaces.

BACKGROUND OF THE INVENTION

Barbecue grills are very widely used today. One popular type of barbecue grill is referred to as a kettle-type grill, which utilizes a cooking chamber in the form of a barbeque kettle. A barbecue kettle may consist of a generally semi-spherical bottom bowl that has a circular opening with a cooking grid located slightly below the upper rim of the bowl. A generally semi-spherical top cover can be placed on the bottom bowl to enclose the barbecue kettle. The barbecue kettle is supported on a leg arrangement. One popular type of such a kettle grill configuration is a registered trademark of the Assignee of the present invention, Weber-Stephen Products Company.

A feature that has become quite popular with barbecue grills is a work surface attached to the cart frame of the grill. One or more work surfaces are desirable and convenient because they provide a surface upon which food and food preparation items, such as spices, sauces, utensils, plates, etc., can be placed while the food is being prepared. These work surfaces are also usually disposed immediately adjacent to the cooking chamber on the grill frame. Some grill frame assemblies are designed in a cart style that can accommodate one or more work surfaces, while maintaining structural rigidity of the frame assembly.

Present charcoal grills typically do not provide an integral frame design that can accommodate a work surface while also accommodating the depth of the cooking chamber in a rigid frame assembly. Furthermore, present charcoal grills often do not provide a mobile cart structure with a frame assembly that can also support a work surface. One type of kettle grill structure marketed by the assignee of the present invention is the grill product known as the Performer® grill, disclosed in U.S. Pat. No. 5,027,788. The Performer® grill product is an example of a charcoal grill that does utilize a cart structure. Nevertheless, there is a need for a grill cart structure that is easy to manufacture and assemble, and while providing suitable attachment of a work surface.

Therefore, it is an object of the present invention to provide a frame assembly for a barbecue grill that supports a work surface and the grill cooking chamber in a rigid manner while minimizing assembly parts and maintaining ease of assembly and manufacturability. This need is addressed by the present invention, as recently introduced by the product marketed by the Assignee of the invention in the grill having the ornamental appearance disclosed and claimed in co-pending application Ser. No. 29/116,086. That Application relates to the ornamental design of a product which serves as an example of how the present invention may be used.

SUMMARY OF THE INVENTION

The present invention is a frame assembly for a barbecue grill that provides rigid support for a cooking chamber and a work surface disposed adjacent to the chamber. The frame assembly comprises at least two U-shaped frame members, each formed of a bended contiguous tubular material, with at least one support member disposed transverse to the U-shaped members attached thereto, such that the two U-shaped frame members are in a spaced relation to each other to create a space therebetween to accommodate a cooking chamber and a work surface.

In a particular embodiment, the support members each include receivers that engage a portion of the U-shaped frame members. The receiver are formed by cooperation of a channel portion and a clamping portion at each end of the support member. Preferably, the clamping portion is formed of a clamping member that includes a portion that is complementary to the channel portion of the support member, to form the receiver as a gripping collar for engaging the tubular material. The engaged portion of the U-shaped frame members is along an extent of the tubular material which defines a clamping height that is adapted to provide rigidity of the grill assembly.

Another object of the present invention is to provide a barbecue grill cart structure that is formed of at least two generally U-shaped tubular frame members, each formed by bending substantially contiguous tubular material with a first and second bend to define generally vertical first and second legs separated by an intermediate generally horizontal portion. It is further an object of the present invention to provide a method of manufacturing a barbecue grill frame structure that includes the steps of bending at least two segments of elongated tubular material into first and second U-shaped frame members. Each of such U-shaped members being made by forming two bends in each segment the tubular material, and providing at least one transverse member joining the U-shaped members with a clamping receiver to engage an extent of the first tubular segment at a first end of the transverse member, and another clamping receiver to engage an extent of the second tubular segment at a second end of the transverse member.

Other features and advantages of the invention will be apparent from consideration of the following specification and drawings.

DETAILED DESCRIPTION OF THE PREFERRED EMBODIMENTS

Figure 1:
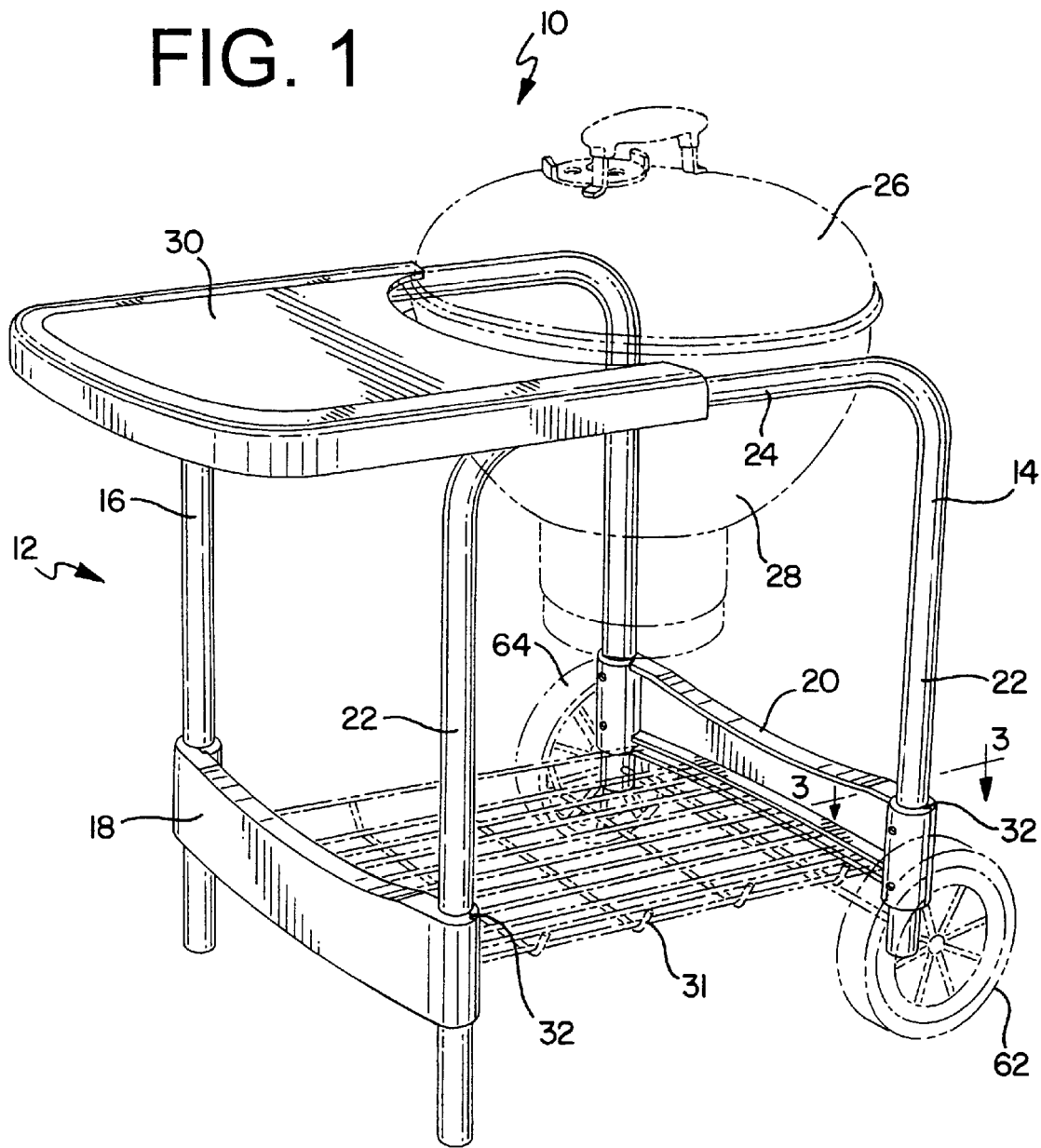
FIG. 1 is a perspective view of a barbecue grill assembly incorporating an embodiment of the present invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated. Further, while the present invention may be used to make grill assemblies having differing ornamental appearances, the preferred embodiment disclosed herein is an example of a grill assembly having one particular appearance, as disclosed in co-pending application Ser. No. 29/116,086.

FIG. 1 depicts a barbecue grill 10 that incorporates a flame assembly 12 of the present invention. The frame assembly 12 includes a first U-shaped member 14 and a second U-shaped member 16 spaced apart by two support members 18 and 20, as shown in FIG. 1. The U-shaped members 14 and 16 each include two legs 22 joined by a middle portion 24 disposed transverse to the two legs 22 to form the U-shape. The support members 18 and 20 each attach to one of the legs 22 of each of the U-shaped members 14 and 16, as shown in FIG. 1.

Figure 2:
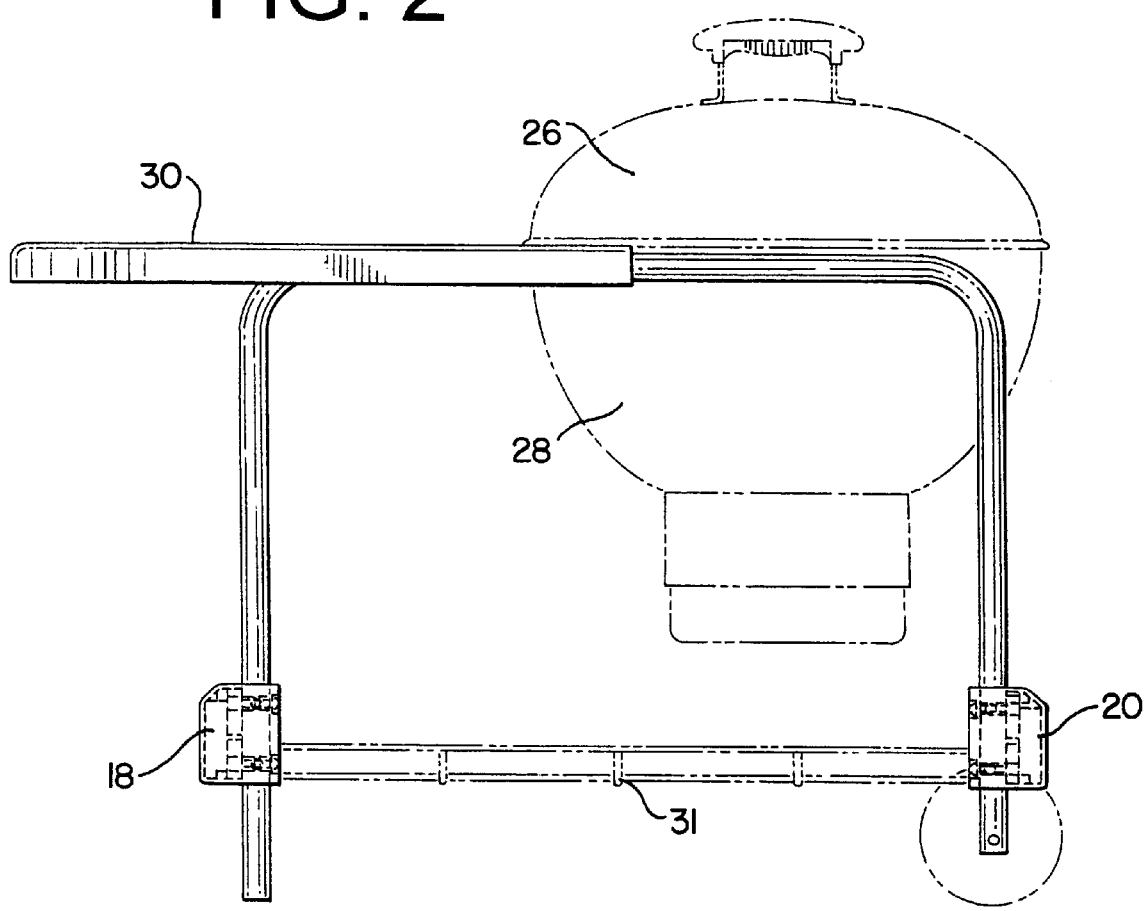
FIG. 2 is a side elevational view of the grill of FIG. 1.

The spaced apart U-shaped frame members 14 and 16 allow for a cooking chamber 26 to be disposed therebetween, as shown in FIG. 1. The cooking chamber 26 is mounted to the middle generally horizontal portions 24 of the U-shaped members 14 and 16 such that a lower portion 28 of the chamber 26 is disposed below the middle portions 24, as shown in FIG. 2. This provides advantages of a stable attachment of the chamber 26, since the center of gravity of the chamber 26 is kept low with respect to the frame assembly 12. The cooking chamber 26 is secured to the frame assembly 12, preferably with the use of a fastener, adapted to provide at least one of the connections between the U-shaped members 14, 16 and aiding in the rigidity to the top of the frame assembly 12. The middle portions 24 of the U-shaped members 14 and 16 also allow for the attachment of a work surface 30, as shown in FIGS. 1 and 2. The work surface is preferably also secured to each of the members 14, 16 in a manner adapted to provide at least one of the connections between the members 14, 16. Preferably, securement of the work surface 30 to the members 14, 16 is aided by mechanical fasteners. Alternatively, the work surface 30 may be secured by use of frictional fit, such as may be provided by molded plastic flanges on the underside or sides of the work surface 30. A rack, or shelf 31, may also be attached to the frame assembly 12, as shown in FIGS. 1 and 2.

In a preferred embodiment, the securement of the cooking chamber 26 and the work surface 30 to the members 14, 16 provide the only attachment securing the two members in the middle portions 24 of the members 14, 16. In this embodiment, the frame 12 is assembled as a rigid structure by securing the cooking chamber 26 and work surface 30 at the upper portion of the members 14, 16, and by transverse support members 18,20 secured at the lower portions of the members 14, 16. In other words, by fastening the cooking chamber 26 and work surface 30 at the upper portion if the members 14, 16, no transverse support members are needed at the upper portion of the frame members 14, 16.

Rigidity is provided to the bottom of the frame assembly 12 via the support members 18 and 20. The support members 18 and 20 include receivers 32 formed at each end of the support members 18 and 20. One of the legs 22 of each of the U-shaped members 14 and 16 are disposed within at least one of the receivers 32 of each of the support members 18 and 20, as shown in FIG. 1.

Figure 3:
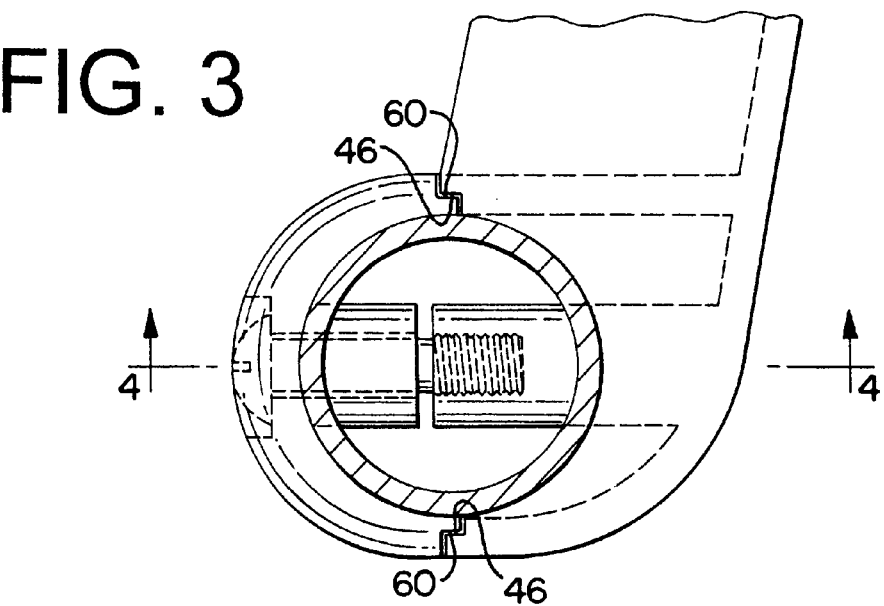
FIG. 3 is a partial cross-sectional view of a clamping member engaging a leg of a U-shaped member and a support member of the grill of FIG. 1, wherein the cross-section is taken along section line 3—3 as shown in FIG. 1.
Figure 4:
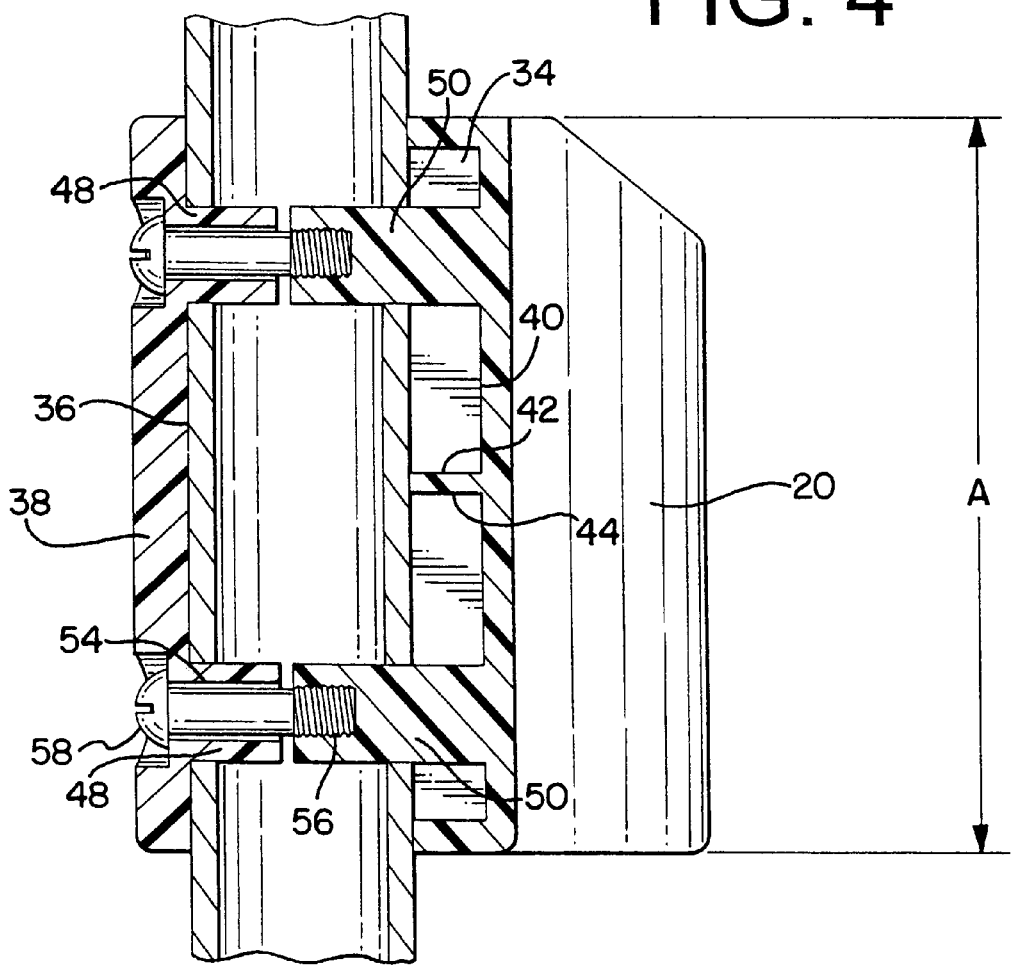
FIG. 4 is a partial cross-sectional view of the clamping member engaging the leg of the U-shaped member and the support member taken along section line 4—4 as shown in FIG. 3.

FIG. 3 is a partial cross-sectional view taken along section line 3—3 shown in FIG. 1, which shows one of the legs 22 of the first U-shaped member 14 disposed within one of the receivers 32 of the support member 20. All of the legs 22 of the support members 18 and 20 engage the U-shaped members in the same way. For simplicity of description, the engaging portion of only one of the legs 22, as depicted in FIG. 3, will be described. Referring to FIG. 3, the receiver 32 is preferably formed as a gripping collar by a channel portion 34 formed within the support member 20 and a clamping channel portion 36 formed within a clamping member 38. The clamping channel portion 36 is complementary to the channel portion 34 such that both portions 34 and 36 cooperatively form the receiver 32 when the clamping member 38 engages the support member 20, as shown in FIG. 3. Preferably, the channel portion 34 and the clamping channel portion 36 cooperate to form the receiver 32 that has an inner wall 40. In a preferred embodiment, the inner wall 40 includes one or more ribs 42 that provide an inner gripping surface 44, as shown in FIG. 4. Certain portions of the inner wall 40 may also be used as gripping surfaces, such as surfaces 46 of the inner wall 40, as shown in FIG. 3. In this manner, the receiver 32 is preferably formed as a gripping collar at least partially surrounding the engaging portion of the leg 22 and cooperatively constricting to grip the outer surface of the leg 22. Preferably, the clamping member 38 includes bosses 48 disposed within the clamping channel portion 36 and the support member 20 includes bosses 50 disposed within the channel portion 34, as shown in FIGS. 3 and 4. The leg 22 of the U-shaped member 16 preferably has through-holes 52 that allow the bosses 48 and 50 to be disposed therein when the clamping member 38 is mated with the support member 20, as shown in FIG. 4. Each boss 48 has thru-holes 54 and the mating boss 50 has threaded blind holes 56 to accommodate at least one fastener 58 (such as screws) for attachment of the clamping member 38 to the support member 20. In this manner, tightening of the fastener draws the inner walls of the receiver 32 together to clampingly engage the leg 22. In a preferred embodiment, the outer diameter of the leg 22 is larger than the inner diameter of the receiver 32 so that clamping engagement between the receiver 32 and the leg 22 is insured. Since the outer diameter of the leg 22 is larger than the inner diameter of the receiver 32, a gap 60 may exist between the clamping member 38 and the support member 20, as shown in FIG. 3, depending on the clamping force applied via the fasteners 58 and the subsequent deformation of the leg 22.

The portion of the leg 22 of the U-shaped member 16 that is disposed within the receiver 32 of the support member 20 is an extent of the tubular material of the leg 22 defined by a clamping height dimension A, as shown in FIG. 4. The clamping height A is defined as the dimension between the uppermost and lowermost clamping contact point between the receiver 32 and the leg 22. The clamping height A is preferably adapted to have an extent to provide rigidity of the grill assembly 10. The clamping height A can be virtually any dimension suitable for the overall design requirements of the frame assembly 12. Preferably, the clamping height A is about 4 inches. This dimension provides good stability while maintaining adequate piece-part costs of the frame assembly 12.

In the preferred embodiment, the barbecue grill 10 is formed with a cart frame 12 having a structure that is formed of the at least two generally U-shaped tubular members 14, 16, each formed by bending substantially contiguous tubular material. The members 14, 16 each have a first and second bend of the tubular material to define generally vertical first and second legs 22 separated by the intermediate generally horizontal middle portion 24, to form a structure such as shown and described above. An important aspect of this embodiment of the invention is that each of the members 14, 16 are easily formed by simply bending at least two segments of the tubular material into the two U-shaped arrangements.

Accordingly, using the method of this embodiment of the invention, the manufacture of the cart frame 12 is achieved including the steps of bending at least two separate segments of tubular material into first and second U-shaped frame members 14, 16. Each of such U-shaped members 14, 16 is thereby made by forming two bends in each segment the tubular material. The frame is further made by providing at least one transverse member 20 joining the U-shaped members, with a clamping receiver 32 to engage an extent of the first member 14 at a first end of the transverse member, and another clamping receiver 32 to engage an extent of the second member 16 at a second end of the transverse member 20. Using this method of this embodiment, the cart frame 12 is easily made with a rigid structure of two solid frame members 14, 16 formed of bending tubular material, to provide U-shaped frame members 14, 16 of the frame 12 without the use of welding or fasteners. Further, by this method, the transverse members disclosed herein as support members 20 secure the frame members 14, 16 by constriction of a gripping collar receiver 32 that engages the tubular material outer surface.

In a preferred embodiment, at least a pair of opposed adjacent wheels 62 and 64 are secured to the frame to provide mobility of the assembly 10. The first wheel 62 is secured to one leg 22 of one member 14, and the second wheel 64 is secured to the adjacent leg 22 of the other member 16. Of course, the wheels 62, 64 may be provided on legs 22 of a single member 14 in the alternative. Preferably, the legs 22 receiving the wheels 62, 64 have lengths shorter than the remaining legs 22, to accommodate for the height needed for rotation of the wheels 62, 64.

While the specific embodiments have been illustrated and described, numerous modifications come to mind without significantly departing from the spirit of the invention, and the scope of protection is only limited by the scope of the accompanying Claims.

What is claimed is:

1. A barbecue grill and frame assembly having a cooking chamber, the assembly comprising:
   two integrally-formed generally U-shaped frame members; and
   a support member including a channel portion at each end of the support member and a clamping member cooperating to define an inner surface adapted to engage a portion of one the U-shaped frame members, the support member disposed transverse to the generally U-shaped members such that a portion of one of the U-shaped frame members is disposed within one of the channel portions of the support member and a portion of the other of the U-shaped frame members is disposed within the other of the channel portions of the support member;
   wherein the clamping member and channel portions each include at least one protrusion disposed on the inner surface that act to prevent movement of the U-shaped frame member with respect to the inner surface; and
   wherein the support member maintains the two generally U-shaped frame members in a spaced relation to each other to accommodate the cooking chamber therebetween.

2. The grill assembly of claim 1, wherein the support member includes two clamping members, one at each end of the support member.

3. The grill assembly of claim 1, wherein the engaged portion of the U-shaped members includes through holes to allow the protrusions of the support member and the clamping member to be disposed therein.

4. The grill assembly of claim 1, wherein the respective protrusion of the clamping member and the support member are bosses that are in substantial alignment with each other when the clamping member engages the support member.

5. The grill assembly of claim 4, wherein one of the respective bosses includes a through hole and the other of the respective bosses includes a threaded blind hole.

6. The grill assembly of claim 5, wherein the engaged portion of the U-shaped members includes through holes to allow the bosses of the support member and the clamping member to be disposed therein.

7. The grill assembly of claim 6, wherein the clamping member is attached to the support member by screws that engage the bosses of the support member and the clamping member.

8. A barbecue grill and frame assembly for an outdoor barbecue grill having a cooking chamber, the assembly comprising:
   a first integrally-formed U-shaped frame member and a second integrally-formed U-shaped frame member both having two generally vertical leg sections and a middle section transverse to the two leg sections, the second U-shaped frame member disposed in a spaced relationship to the first U-shaped frame member;
   at least one support member including a gripping collar disposed at each end, the support member disposed generally transverse to the first and second U-shaped members such that a portion of one of the two leg sections of the first U-shaped frame member is disposed within one of the gripping collars of the support member and a portion of one of the two leg sections of the second U-shaped frame member is disposed within the other gripping collar of the support member; and
   a clamping member cooperating with said gripping collar to engage a portion of the leg sections;
   wherein one of either the gripping collars or the clamping member include at least one protrusion disposed on a surface that engages one of the U-shaped frame members to prevent movement of the U-shaped frame members with respect to the support member; and
   wherein the cooking chamber is supported by the U-shaped frame members.

9. The assembly of claim 8, further including a shelf disposed within the space between the legs of the U-shaped members.

10. The assembly of claim 8, further including a work surface supported by the U-shaped frame members.

11. The assembly of claim 8, wherein the engaged portions of the U-shaped frame members include a hole to allow the protrusion to be disposed therein.

12. The assembly of claim 8, wherein both the clamping member and the gripping collars include a protrusion.

13. The assembly of claim 12, wherein the engaged portions of the U-shaped frame members include holes to allow the protrusions to be disposed therein.

14. The assembly of claim 8, wherein the clamping member comprises two separate clamping members that each mate with one of the gripping collars on the ends of the support member.

15. The assembly of claim 14, wherein the clamping members each have a surface that engages one of the U-shaped frame members.

16. The assembly of claim 14, wherein the clamping members are mechanical fasteners.

17. The assembly of claim 14, wherein both the clamping members and the gripping collars include a protrusion.

18. The assembly of claim 17, wherein the engaged portions of the U-shaped frame members include holes to allow the protrusions to be disposed therein.

19. A barbecue grill and frame assembly having a cooking chamber and a work surface, the assembly comprising:

at least two U-shaped frame members; and at least one support member disposed transverse to the generally U-shaped members and attached thereto such that the two generally U-shaped frame members are in a spaced relation to each other;

wherein the cooking chamber is disposed between and attached to the two generally U-shaped frame members and the work surface is also attached to the two generally U-shaped frame members;

wherein the support member includes a channel portion and a clamping member at each end of the support member cooperating to define an inner surface adapted to engage a portion of the U-shaped frame member disposed within the receiver of the support member; and wherein the clamping member and channel portion each include at least one boss disposed within the receiver, the respective bosses being in substantial alignment with each other when the clamping member engages the support member.

20. The grill assembly of claim 19, wherein one of the respective bosses includes a through hole and the other of the respective bosses includes a threaded blind hole.

21. The grill assembly of claim 20, wherein the engaged portion of the U-shaped member includes through holes to allow the bosses of the support member and the clamping member to be disposed therein.

22. The grill assembly of claim 21, wherein the clamping member is attached to the support member by screws that engage the bosses of the support member and the clamping member.

23. A barbecue grill assembly having a cooking chamber and a frame assembly, the grill assembly comprising:

first and second generally U-shaped frame members, each said frame member being formed of substantially continuous tubular material with a first bend defining a downturn for a first leg and a second bend defining a second downturn for a second leg, a middle portion passing between said first and second bends;

a plurality of cross members generally transverse to said legs and adapted to secure said first U-shaped frame member to said second U-shaped frame members;

the cooking chamber being secured to the middle portion of said first and second members;

wherein each said cross member has at least a first receiver secured to one of either first or second frame members, and having a second receiver secured to the other of said first or second frame member, each said receiver having a gripping collar adapted to provide an inner gripping surface engaged in friction fit with a portion of one of said frame member legs.

* * * * *